US008626844B2

(12) United States Patent
Schulzrinne et al.

(10) Patent No.: US 8,626,844 B2
(45) Date of Patent: Jan. 7, 2014

(54) METHODS AND MEDIA FOR EXCHANGING DATA BETWEEN NODES OF DISCONNECTED NETWORKS

(75) Inventors: Henning G. Schulzrinne, Leonia, NJ (US); Suman Ramkumar Srinivasan, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 252 days.

(21) Appl. No.: 12/593,209

(22) PCT Filed: Mar. 26, 2008

(86) PCT No.: PCT/US2008/058294
§ 371 (c)(1),
(2), (4) Date: Nov. 23, 2009

(87) PCT Pub. No.: WO2008/118976
PCT Pub. Date: Oct. 2, 2008

(65) Prior Publication Data
US 2010/0070600 A1   Mar. 18, 2010

Related U.S. Application Data

(60) Provisional application No. 60/920,240, filed on Mar. 26, 2007.

(51) Int. Cl.
*G06F 15/16*   (2006.01)
(52) U.S. Cl.
USPC .......................... 709/206; 707/713; 707/770
(58) Field of Classification Search
None
See application file for complete search history.

(56) References Cited

U.S. PATENT DOCUMENTS

| 5,440,723 | A | 8/1995 | Arnold et al. |
| 5,896,373 | A | 4/1999 | Mitts et al. |
| 6,101,541 | A * | 8/2000 | Ellesson et al. ............... 709/225 |
| 6,473,413 | B1 | 10/2002 | Chiou et al. |
| 6,681,108 | B1 | 1/2004 | Terry et al. |

(Continued)

FOREIGN PATENT DOCUMENTS

WO   WO2008116976   10/2008

OTHER PUBLICATIONS

Curl Website, "Libcurl—The Multiprotocol File Transfer Library", Dec. 2006, available at: http://curl.haxx.se/libcurl/.

(Continued)

*Primary Examiner* — Mohamed Ibrahim
(74) *Attorney, Agent, or Firm* — Byrne Poh LLP (57) ABSTRACT

Methods and media for exchanging data between nodes of disconnected networks are provided, including: determining a query type based on whether a query received at a first node includes at least one keyword or at least a portion of a uniform resource identifier; performing a search of a cache based on the query and the query type; converting the query into a formatted query document; storing the formatted query document in a database, if the search of the cache does not yield at least a predetermined number of data items; retrieving the formatted query document from the database at a predetermined interval; multicasting the retrieved formatted query document from the first node to at least a second node; and receiving, at the first node, a formatted response document from the second node, the formatted response document resulting from a search of a cache of the second node.

16 Claims, 7 Drawing Sheets

(56) References Cited

U.S. PATENT DOCUMENTS

| | | | |
|---|---|---|---|
| 6,690,918 B2 | 2/2004 | Evans et al. | |
| 6,965,674 B2 | 11/2005 | Whelan et al. | |
| 7,082,114 B1 | 7/2006 | Engwer et al. | |
| 7,133,526 B2 | 11/2006 | Whelan et al. | |
| 7,171,215 B2 | 1/2007 | Khouaja et al. | |
| 7,219,239 B1 | 5/2007 | Njemanze et al. | |
| 7,246,156 B2 | 7/2007 | Ginter et al. | |
| 7,373,508 B1 | 5/2008 | Meier et al. | |
| 7,376,128 B2 | 5/2008 | Chen et al. | |
| 7,376,969 B1 | 5/2008 | Njemanze et al. | |
| 7,444,679 B2 | 10/2008 | Tarquini et al. | |
| 7,502,615 B2 | 3/2009 | Wilhoite et al. | |
| 7,519,998 B2 | 4/2009 | Cai et al. | |
| 7,543,125 B2 | 6/2009 | Gokhale | |
| 7,607,170 B2 | 10/2009 | Chesla | |
| 7,620,723 B2 | 11/2009 | Chen et al. | |
| 7,643,464 B2 | 1/2010 | Garg | |
| 7,681,235 B2 | 3/2010 | Chesla et al. | |
| 7,773,587 B2 | 8/2010 | Corcoran | |
| 7,805,140 B2 | 9/2010 | Friday et al. | |
| 7,873,352 B2 | 1/2011 | Nguyen et al. | |
| 7,877,621 B2 | 1/2011 | Jacoby et al. | |
| 7,924,785 B2 | 4/2011 | Shaheen et al. | |
| 8,041,319 B2 | 10/2011 | He et al. | |
| 2001/0036834 A1 | 11/2001 | Das et al. | |
| 2002/0135515 A1 | 9/2002 | Rankin | |
| 2003/0050959 A1* | 3/2003 | Faybishenko et al. | 709/202 |
| 2003/0084319 A1 | 5/2003 | Tarquini et al. | |
| 2003/0084344 A1 | 5/2003 | Tarquini et al. | |
| 2003/0187832 A1* | 10/2003 | Reader | 707/3 |
| 2004/0111477 A1 | 6/2004 | Boss et al. | |
| 2004/0190902 A1 | 9/2004 | Tamai | |
| 2004/0267876 A1* | 12/2004 | Kakivaya et al. | 709/200 |
| 2005/0038876 A1 | 2/2005 | Chaudhuri | |
| 2005/0063325 A1 | 3/2005 | Kim et al. | |
| 2005/0088993 A1 | 4/2005 | Jung et al. | |
| 2005/0101309 A1* | 5/2005 | Croome | 455/418 |
| 2005/0122940 A1 | 6/2005 | Nian | |
| 2005/0138178 A1 | 6/2005 | Astarabadi | |
| 2005/0141457 A1 | 6/2005 | Lee | |
| 2005/0201330 A1 | 9/2005 | Park et al. | |
| 2005/0255847 A1 | 11/2005 | Han et al. | |
| 2005/0259671 A1 | 11/2005 | Jung et al. | |
| 2005/0282547 A1 | 12/2005 | Kim et al. | |
| 2006/0025128 A1 | 2/2006 | Lee | |
| 2006/0089876 A1 | 4/2006 | Boys | |
| 2006/0187873 A1 | 8/2006 | Friday et al. | |
| 2006/0218229 A1 | 9/2006 | Pandey et al. | |
| 2006/0229054 A1 | 10/2006 | Erola et al. | |
| 2006/0274743 A1 | 12/2006 | Yegin et al. | |
| 2007/0233776 A1 | 10/2007 | Palm | |
| 2008/0076409 A1 | 3/2008 | Hinrikus et al. | |
| 2008/0192691 A1 | 8/2008 | Park et al. | |
| 2008/0285520 A1 | 11/2008 | Forte | |
| 2010/0142484 A1 | 6/2010 | Bachmann et al. | |
| 2010/0322198 A1 | 12/2010 | Friday et al. | |
| 2011/0064063 A1 | 3/2011 | Kim et al. | |
| 2011/0182270 A1 | 7/2011 | Shaheen et al. | |

OTHER PUBLICATIONS

Cygwin Website, "Cygwin User's Guide", Dec. 2006, available at: http://cygwin.com/.
Darwinports Website, 2006, available at: http://www.darwinports.org/.
Dodgeball, "Help Page", Sep. 2006, available at: http://www.dodgeball.com/help.
Gnutella Website, 2006, available at: http://www.the-gdf.org/.
IEEE Computer Society, "IEEE Standard for Information Technology—Telecommunications and Information Exchange Between Systems—Local and Metropolitan Area Networks—Specific Requirements: Amendment 8: Medium Access Control (MAC) Quality of Service Enhancements", 2005.
IEEE Computer Society, IEEE Standard for Information Technology, Telecommunications and Information Exchange Between Systems, Local and Metropolitan Area Networks, Specific Requirements—Amendment 6: Medium Access Control (MAC) Security Enhancements, 2004.
International Search Report in International Patent Application No. PCT/US2006/042713, filed Oct. 31, 2006, mailed Apr. 9, 2008.
International Search Report in International Patent Application No. PCT/US2007/022188, filed Oct. 17, 2007, mailed Jun. 20, 2008.
LibESMTP Website, Dec. 2006, available at: http://www.stafford.uklinux.net/libesmtp.
Lighttpd Website, Dec. 2006, available at: http://www.lighttpd.net/.
Longo, C., "Your Wireless Future", CNN Money.com, Jun. 1, 2006, available at: http://money.cnn.com/magazines/business2/business2_archive/2006/05/01/8375915/index.htm.
Microsoft TechNet, "People Near Me", Sep. 27, 2006, available at: http://technet.microsoft.com/en-us/library/bb726969.aspx.
Office Action dated May 8, 2012 in U.S. Appl. No. 12/092,224.
Office Action dated May 24, 2012 in U.S. Appl. No. 12/125,617.
PC Engines, "WRAP: Wireless Router Application Platform", Dec. 2006, available at: http://www.pcengines.ch/wrap.htm.
Plazes Website, "FAQ—What's Plazes", Sep. 2006, available at: http://www.plazes.com/info/whatis/.
Porchdog Software, "Howl: Man's New Best Friend", May 2006, available at: http://www.porchdogsoft.com/products/howl/.
Public Internet Project Website, Jul. 2006, available at: http://publicinternetproject.org/.
Relax NG Website, Dec. 2006, available at http://www.relaxng.org/.
RSS 2.0 at Harvard Law, "The RSS 2.0 Specification", Jul. 15, 2003, available at: http://blogs.law.harvard.edu/tech/rss.
Singel, R., "Meetro Eases Hookups in Your Hood", Wired News, Sep. 29, 2005, available at: http://www.wired.com/culture/lifestyle/news/2005/09/69023.
SQLite Website, Dec. 2006, available at: http://www.sqlite.org/.
Swish-e: Simple Web Indexing System for Humans-Enhanced Website, Dec. 2006, available at: http://www.swish-e.org/.
Tew, C., "The Fist P2P PVR from NDS Plus Innovative 'Distributed DVR'", Jan. 29, 2007, available at: http://www.pvrwire.com/2007/01/29/announcements-from-nds/.
TheoryOrg, "Bittorrent Protocol Specification 1.0", Dec. 2006, available at: http://wiki.theory.org/BitTorrentSpecification.
Wongrujira, K. et al., "Monetary Incentive with Reputation for Virtual Market-Place Based P2P", In Proceedings of the 2005 ACM Conference on Emerging Network Experiment and Technology (CoNEXT '05), 2005, pp. 135-145.
Zero Configuration Networking (Zeroconf) Website, Dec. 2006, available at: http://www.zeroconf.org/.
Aboba, B., et al., "Detecting Network Attachment in IPv4 (DNAv4)", RFC 4436, Mar. 2006.
Almeida, V. et al., "Characterizing Reference Locality in the WWW," in Proceedings of the IEEE Conference on Parallel and Distributed Information Systems (PDIS), Miami Beach, FL, 1996, [Online]. Available: citeseer.ist.pse.edu/almeida96characterizing.html.
Antoniadis, P. et al., "Incentives for Content Availability in Memory-Less Peer-to-Peer File Sharing Systems", SIGecom Ech., 2005, pp. 11-20, vol. 5, No. 4.
B. Sun, K. Wu and U. W. Pooch, "Alert aggregation in mobile ad hoc networks," Proceedings of the 2003 ACM workshop on Wireless security, San Diego, CA, Sep. 2003.
Balachandran, A. et al., "Characterizing User Behavior and Network Performance in a Public Wireless LAN", Measuring and Modeling of Computer Systems, 2002, vol. 30.
Buragohain, C. et al., "A Game Theoretic Framework for Incentives in P2P Systems", In P2P '03: Proceedings of the 3rd International Conference on Peer-to-Peer Computing, 2003, p. 48, Washington, DC, USA.
Buttyan, L. et al., "Spontaneous Cooperation in Multi-Domain Sensor Networks", In ESAS, 2005, pp. 42-53.
Camarillo, G. et al., "Grouping of Media Lines in the Session Description Protocol (SDP)", RFC 3388. Dec. 2002.
Chandra, R. et al., "MultiNet: Connecting to Multiple IEEE 802.11 Networks Using a Single Wireless Card", In Proceedings of the IEEE INFOCOM Conference, 2004.
Chandra, R. et al., "WiFiProfiler: Cooperative Diagnosis in Wireless LANs", In MobiSys 2006: Proceedings of the 4th International Con-

(56) References Cited

OTHER PUBLICATIONS ference on Mobile Systems, Applications and Services, 2006, pp. 205-219, ACM Press, New York, NY, USA.

Chow, R. et al., "Authentication in the Clouds: A Framework and its Application to Mobile Users," CCSW'10, Oct. 8, 2010, Chicago, Illinois, USA 2010.

Combs, G. et al., "Ethereal: Network Protocol Analyzer", 2005, http://www.ethereal.com/.

D. Sterne, P. Balasubramanyam, et. al., "A General Cooperative Intrusion Detection Architecture for MANETs", Proceedings of the 3rd IEEE International Workshop on Information Assurance, University of Maryland, Mar. 2005.

D. Subhadrabandhu, S. Sarkar, and F. Anjum, "Efficacy of Misuse Detection in Adhoc Networks", Proceedings of the 2004 First Annual IEEE Communications Society Conference on Sensor and Ad Hoc Communications and Networks, Santa Clara, CA, Oct. 2004.

D. Wagner and P. Soto, "Mimicry Attacks on Host-based Intrusion Detection Systems", Proceedings of the 9th ACM Conference on Computer and Communications Security, Washington, DC, 2002.

Day, H. S. M. et al., "A Model for Presence and Instant Messaging". RFC 2778, Feb. 2000.

Droms, R., "Dynamic Host Configuration Protocol," RFC 2131, Mar. 1997.

Feldman, M. et al., "Robust Incentive Techniques for Peer-to-Peer Networks," In EC '04: Proceedings of the 5th ACM Conference on Electronic Commerce, pp. 102-111, ACM Press, New York, NY. USA.

Forte, A. G. et al., "IEEE 802.11 in the Large: Observations at the IETF Meeting", Columbia University, Tech. Rep., Nov. 2006.

Forte, A. G. et al., "Improving L3 Handoff Delay in IEEE 802.11 Wireless Networks," In WICON '06: Proceedings of the 2nd Annual International Wireless Internet Conference, Aug. 2006, ACM Press.

Fretzagias, C. et al., "Cooperative Location-Sensing for Wireless Networks," In PERCOM '04: Proceedings of the Second IEEE International Conference on Pervasive Computing and Communications, 2004, p. 121, Washington DC, USA.

G. Vigna, S. Gwalani, K. Srinivasan, E. M. Belding-Royer and R. A. Kemmerer, "An Intrusion Detection Tool for AODV-Based Ad hoc Wireless Networks", Proceedings of 20th Annual Computer Security Applications Conference, Tucson, AZ, Dec. 2004.

Hayes, A. and Wilson, D., "Peer-to-Peer Information Sharing in a Mobile Ad-Hoc Environment," in Proceedings of the Sixth IEEE WOrkshop on Mobile Computing Systems and Applications, 2004.

Heinemann, V. et al., "iCLouds—Peer-to-Peer Information Sharing in Mobile Environments," in EuroPar 2003. Parallel Processing, 9th International Euro-Par Conference, ser. Lecture Notes in Computer Science, H. Kosch, L. Btlszilrmenyl, and H. Heilwagner, Eds., vol. 2790. Klagenfurt, Austria: Springer, 2003, pp. 1038-1045.

Henderson, T. et al., "The Changing Usage of a Mature Campus-Wide Wireless Network," In MobiCom '04: Proceedings of the 10th Annual International Conference on Mobile Computing and Networking, 2004, pp. 187-201, ACM Press, New York, NY, USA.

Hsieh, R. et al., "S-MIP: A Seamless Handoof Architecture for Mobile IP", In Proceedings of the IEEE INFOCOM Conference, 2003.

Hunter, T. E. et al., "Diversity Through Coded Cooperation," In Proceedings of IEEE Transactions on Wireless Communications, Feb. 2004.

International Patent Application No. PCT/US06/42713, filed Oct. 31, 2006.

International Patent Application No. PCT/US06/45000 filed Nov. 20, 2006.

International Patent Application No. PCT/US07/22188, filed Oct. 17, 2007.

International Patent Application No. PCT/US08/58294, filed Mar. 26, 2008.

International Preliminary Report on Patentability in International Patent Application No. PCT/US06/42713, filed Oct. 31, 2006, mailed Apr. 9, 2009.

International Preliminary Report on Patentability in International Patent Application No. PCT/US06/45000 filed Nov. 20, 2006, mailed Jun. 5, 2008.

International Preliminary Report on Patentability in International Patent Application No. PCT/US07/22188, filed Oct. 17, 2007, mailed Apr. 22, 2009.

International Preliminary Report on Patentability in International Patent Application No. PCT/US08/58294, filed Mar. 26, 2008, mailed Oct. 8, 2009.

International Search Report in International Patent Application No. PCT/US06/45000 filed Nov. 20, 2006, mailed May 14, 2007.

International Search Report in International Patent Application No. PCT/US08/58294, filed Mar. 26, 2008, mailed Aug. 21, 2008.

Jardosh, A. P. et al., "Understanding Link-Layer Behavior in Highly Congested IEEE 802.11b Wireless Networks," in E-WIND '05: Proceedings of the 2005 ACM SIGCOMM Workshop on Experimental Approached to Wireless Network Design and Analysis, 2005, pp. 11-16, ACM Press, New York, NY, USA.

Jelenkovic, P. and Radovanovic, A., "Asymptotic Insensitivity of Least-Recently-Used Caching to Statistical Dependency," 2003. [Online]. Available: citeseer.ist.psu.edu/jelenkovic03asymptotic.html.

K. Wang and S. J. Stolfo, "Anomalous Payload-based Network Intrusion Detection", Proceedings of Recent Advance in Intrusion Detection, France, Sep. 2004.

K. Wang, G. Cretu and S. J. Stolfo, "Anomalous Payload-based Worm Detection and Signature Generation", Proceedings of Recent Advance in Intrusion Detection, Seattle, Sep. 2005.

Kershaw, M. et al., "Kismet: 802.11 Layer 2 Wireless Network Sniffer," 2005, http://www.kismetwireless.net/.

Klemm, A., Lindemann, C., and Waldhorst, O. P., "A Special-Purpose Peer-to-Peer File Sharing System for Mobile Ad Hoc Networks," in Proc. IEEE Seminannual Vehicular Technology Conference (VTC2003—Fall). Orlando, FL.: IEEE, Oct. 2003.

Kortuem, G. et al., "When Peer-to-Peer Comes Face-to-Face: Collaborative Peer-to-Peer Computing in Mobile Ad Hoc Networks," in P2P '01: Proceedings of the First International Conference on Peer-to-Peer Computing (P2P'01). Washington, DC, USA: IEEE Computer Society, 2001, p. 75.

Koutsonikolas, D. et al., "CoCoA: Coordinated Cooperative Localization for Mobile Multi-Robot Ad Hoc Networks," 2006, ICDSCW, vol. 0, p. 9.

Lemon, T. et al., Node-Specific Client Identifiers for Dynamic Host Configuration Protocol Version Four (DHCPv4), RFC 4361, Feb. 2006.

Liu, P., "A Cooperative MAC Protocol for Wireless Local Area Networks," In ICC '05: Proceedings of the International Conference on Communications, IEEE Computer Society, May 2005, pp. 2962-2968.

Malinen, J. et al., "Hostap: Wireless Driver for Intersil Prism 2/2.5/3." 2005, http://hostap.epitest.fi.

Malinen, J. et al., "Linux WPA/WPA2/IEEE 802.1x Supplicant," 2005, http://hostap.epitest.fi.

Mishra, A. et al., "An Empirical Analysis of the IEEE 802.11 MAC Layer Handoff Process," SIGCOMM Comput. Commun. Rev., 2003, pp. 93-102, vol. 33, No. 2.

Narayanan, S. et al., "Detecting Network Attachment in IPv6 Networks (DNAv6)," IETF Draft Oct. 2006.

Office Action dated Jul. 22, 2011 in U.S. Appl. No. 12/125,617.

Ote, D. V., "A SIP-Based Method for Intra-Domain Handoffs," In VTC—Fall '03: Proceedings of the 58th Vehicular Technology Conference 2003, 2003, pp. 2068-2072.

Papadopouli, M. et al., "Effects of Power Conservation, Wireless Coverage and Cooperations on Data Dissemination Among Mobile Devices," In MobiHoc '01: Proceedings of the 2nd ACM International Symposium on Mobile Ad Hoc Networking and Computing, 2001, pp. 117-127, New York, NY, USA.

Papadopouli, M., and Schulzrinne, H., "Design and Implementation of a Peer-to-Peer Data Dissemination and Prefetching Tool for Mobile Users," In First NY Metro Area Networking Workshop, IBM TJ Watson Research Center, Hawthorne, New York, Mar. 2001.

(56) References Cited

OTHER PUBLICATIONS

Papadopouli, M., and Schulzrinne, H., "Seven Degrees of Separation in Mobile Ad Hoc Networks," in IEEE GLOBECOM, San Francisco, Nov. 2000.
Perkins, C. E. et al., "Route Optimization for Mobile IP," Cluster Computing, 1998, pp. 161-176, vol. 1, No. 2.
R. G. Cole, N. Phamdo, M. A. Rajab, A. Terzis, "Requirements on Worm Mitigation Technologies in MANETS." Proceedings of the 19th Workshop on Principles of Advanced and Distributed Simulation, Monterey, CA, Jun. 2005.
Ramani, I. et al., "Syncscan: Practical Fast Handoff for 802.11 Infrastructure Networks," In Proceedings of the IEEE INFOCOM Conference, 2005.
Rigney, C. et al., "Remote Authentication Dial In User Service (RADIUS)," RFC 2865, Jun. 2000.
Rosenberg, J., Schulzrinne, H., Camarillo, G., Johnston, A. R., Peterson, J., Sparks, R., Handley, M., and Schooler, E. (Jun. 2002) "SIPP: Session Initiation Protocol." RFC 3261. [Online]. Available: http://www.ietf.org/rfc/3261.txt.
S. J. Stolfo, F. Apap, E. Eskin, K. Heller, S. Hershkop, A Honig and K. Svore. "A Comparative Evaluation of Two Algorithms For Windows Registry Anomaly Detection", Journal of Computer Security, 2005. (unpublished).
Schosser, S. et al., "Incentives Engineering for Structured P2P Systems—A Feasibility Demonstration Using Economic Experiments," In EC '06: Proceedings of the 7th ACM Conference on Electronic Commerce, 2006, pp. 280-289, New York, NY, USA.
Schulzrinne, H. et al., "Application-Layer Mobility Using SIP," SIGMOBILE Mob. Comput. Commun. Rev., 2000, pp, 47-57, vol. 4, No. 3.
Shin, H. et al., "Reducing MAC Layer Handoff Latency in IEEE 802.11 Wireless LANs," In MobiWac '04: Proceedings of the Second International Workshop on Mobility Management & Wireless Access Protocols, 2004, pp. 19-26, ACM Press, New York, NY, USA.
Simone, D., "802.11k Makes WLANs Measure Up," Mar. 29, 2004, Network World.
Stefanov, A. et al., "Cooperative Space-Time Coding for Wireless Networks," In Proceedings of IEEE Transactions on Communications, Nov. 2005, pp. 1804-1809.
U.S. Appl. No. 12/092,224, filed Apr. 30, 2008.
U.S. Appl. No. 12/125,617, filed May 22, 2008.
U.S. Appl. No. 60/732,019, filed Oct. 31, 2005.
U.S. Appl. No. 60/739,137, filed Nov. 22, 2005.
U.S. Appl. No. 60/813,022, filed Jun. 13, 2006.
U.S. Appl. No. 60/852,449, filed Oct. 17, 2006.
U.S. Appl. No. 60/903,197, filed Feb. 22, 2006.
U.S. Appl. No. 60/732,457, filed Nov. 1, 2005.
U.S. Appl. No. 60/920,240, filed Mar. 26, 2007.
Written Opinion in International Patent Application No. PCT/US06/42713, filed, Oct. 31, 2006, mailed Apr. 9, 2008.
Written Opinion in International Patent Application No. PCT/US06/45000 filed Nov. 20, 2006, mailed May 14, 2007.
Written Opinion in International Patent Application No. PCT/US07/22188, filed Oct. 17, 2007, mailed Apr. 22, 2009.
Written Opinion in International Patent Application No. PCT/US08/58294, filed Mar. 26, 2008, mailed Aug. 21, 2008.
Wu, C. H. et al., "Bidirectional Route Optimization in Mobile IP Over Wireless LAN," In VTC—Fall 2002: Proceedings of the 56th Vehiculer Technology Conference, 2002, pp. 1168-1172.
Y. Huang and W. Lee, "A Cooperative Intrusion Detection System for Ad Hoc Networks", Proceedings of the ACM Workshop on Security in Ad Hoc and Sensor Networks, Fairfax, VA, Oct. 2003.
Yokota, H. et al., "Link Layer Assisted Mobile IP Fast Handoff Method Over Wireless LAN Networks," In MobiCom '02: Proceedings of the 8th Annual International Conference on Mobile Computing and Networking, 2002, pp. 131-139, New York, NY, USA.
Yuen, W. and Schulzrinne, H., "Performance Evaluation of Time-Based and Hop-Based TTL Schemes in Partially Connected Ad Hoc Networks," in Proc. IEEE ICC '06, Jun. 2006.
"DHCP Distribution Version 3.0.7 README File", ISC.org, May 16, 2008, available at: http://www.isc.org/sw/dhcp/.
"Meetro", Wikipedia, Jul. 22, 2007, available at: http://en.wikipedia.org/wiki/Meetro.
"SONbuddy Now Available Online", Greenpacket.com, Dec. 9, 2003, available at: http://www.greenpacket.com/company/news_detail.asp?id=82.
Arrington, M., "Another Proximity Based Im Service", TechCrunch, Aug. 22, 2006, available at: http://techcrunch.com/2006/08/22/another-proximity-based-im-service/.
Brookshier, D., et al., "JXTA: Java P2P Programming", Sams Publishing, Mar. 22, 2002, pp. 1-291.
Eisenstadt, M., "Improving Radius IM for Geolocation + Chat", EisenBlog 2.0, Nov. 1, 2006, available at: http://eisenstadt.wordpress.com/2006/11/01/.
Frankl, P.G. And Goodman, D.J., "Delivering Information 'To Go' via Infostations", Technical Report WICAT TR 02-008, Polytechnic University, Nov. 2002, pp. 1-14.
Locasto, M.E., et al., "Collaborative Distributed Intrusion Detection", Technical Report CUCS-012-04, Department of Computer Science, Columbia University, Mar. 8, 2004.
Mangold, S. and Berlemann, L., "IEEE 802.11k: Improving Confidence in Radio Resource Measurements", In Proceedings of the IEEE 16th International Symposium on Personal, Indoor and Mobile Radio Communications (PIMRC'05), vol. 2, Berlin, DE, Sep. 11-14, 2005, pp. 1009-1013.
Office Action dated Oct. 2, 2012 in U.S. Appl. No. 12/092,224.
Office Action dated Apr. 8, 2013 in U.S. Appl. No. 12/125,617.
Price, G., "Google Makes an Acquisition: Dodgeball.com", Search Engine Watch, May 11, 2005, available at: http://blog.searchenginewatch.com/blog/050511-194257.
Snurchy, "Meetro Beta User Reviews", CNET, Oct. 12, 2005, available at: http://reviews.cnet.com/instant-messaging/meetro-beta/4852-9237_7-31485538.html.
Office Action dated Jul. 19, 2013 in U.S. Appl. No. 12/092,224.

* cited by examiner

METHODS AND MEDIA FOR EXCHANGING DATA BETWEEN NODES OF DISCONNECTED NETWORKS

CROSS-REFERENCE TO RELATED APPLICATION

This application claims the benefit of U.S. Provisional Patent Application No. 60/920,240, filed Mar. 26, 2007, which is hereby incorporated by reference herein in its entirety.

STATEMENT REGARDING FEDERALLY SPONSORED RESEARCH OR DEVELOPMENT

This invention was made with government support under Grant No. 04-12025 awarded by the National Science Foundation. The government has certain rights in the invention.

TECHNICAL FIELD

The disclosed subject matter relates to methods and media for exchanging data between nodes of disconnected networks.

BACKGROUND

Wireless devices are growing in use. They are not only carried by people, but are integrated into physical objects, such as vehicles. In addition, many people rely on being connected to networks, such as the Internet, to keep in contact with other people and/or to access information that is not currently locally-available on their device.

Wireless networks are frequently available in business and homes. However, they are less often available in public places. This is particularly the case in subways, tunnels, and areas remote from population centers. Even if a wireless network is within range, connectivity may be limited because of overloading due to many people attempting to access an available network at the same time during an emergency. In other cases, a wireless network may be available and have sufficient connectivity to process desired communications, but may be a private network for which a user does not have access. However, during any of these times, people may still desire to send information to and/or receive information from networks.

SUMMARY

Some embodiments of the disclosed subject matter provide methods and media for exchanging data between nodes of disconnected networks. In some embodiments, methods for exchanging data between nodes of disconnected networks are provided. The methods including: receiving a query including at least one keyword or at least a portion of a. uniform resource identifier via a user interface of a first node; determining at the first node a query type based on whether the query includes at least one keyword or at least a portion of a uniform resource identifier; performing a search of a cache of the first node based on the query and the query type; converting the query into a formatted query document; storing the formatted query document in a database of the first node, if the search of the cache does not yield at least a predetermined number of data items; retrieving the formatted query document from the database of the first node at a predetermined interval; multicasting the retrieved formatted query document from the first node to at least a second node; receiving, at the first node, a formatted response document from the second node, the formatted response document resulting from a. search of a cache of the second node; converting the formatted response document into a display document; and presenting the displaying document to the user via the user interface of the first node.

In some embodiments non-transitory computer-readable media storing computer-executable instructions that, when executed by a processor, cause the processor to perform a methods for exchanging data between nodes of disconnected networks are provided. The methods including: receiving a query including at least one keyword or at least a portion of a uniform resource identifier via a user interface of a first node; determining at the first node a query type based on whether the query includes at least one keyword or at least a portion of a uniform resource identifier; performing a search of a cache of the first node based on the query and the query type; converting the query into a formatted query document; storing the formatted query document in a database of the first node, if the search of the cache does not yield at least a predetermined number of data items; retrieving the formatted query document from the database of the first node at a predetermined interval; multicasting the retrieved formatted query document from the first node to at least a second node; receiving, at the first node, a formatted response document from the second node, the formatted response document resulting from a search of a cache of the second node; converting the formatted response document into a display document; and presenting the displaying document to the user via the user interface of the first node.

DETAILED DESCRIPTION

Some embodiments of the disclosed subject matter provide systems, methods, and media for exchanging data between nodes of disconnected networks. In some embodiments, a node that is disconnected from a network can send and receive data objects from other nodes, which, for example, have been or soon will be connected to a network such as the Internet.

For example, a node can receive a request from a user describing a desired data object, such as a webpage. The node can multicast the request to other nodes. A node receiving this request can determine if it has the desired data object and, if so, it can send the data object to the node that requested it. In another example, a disconnected node can multicast an e-mail to other nodes. A node receiving this request can store the e-mail and, if the receiving node is or becomes connected to a network, can send the e-mail to its destination.

Figure 1:
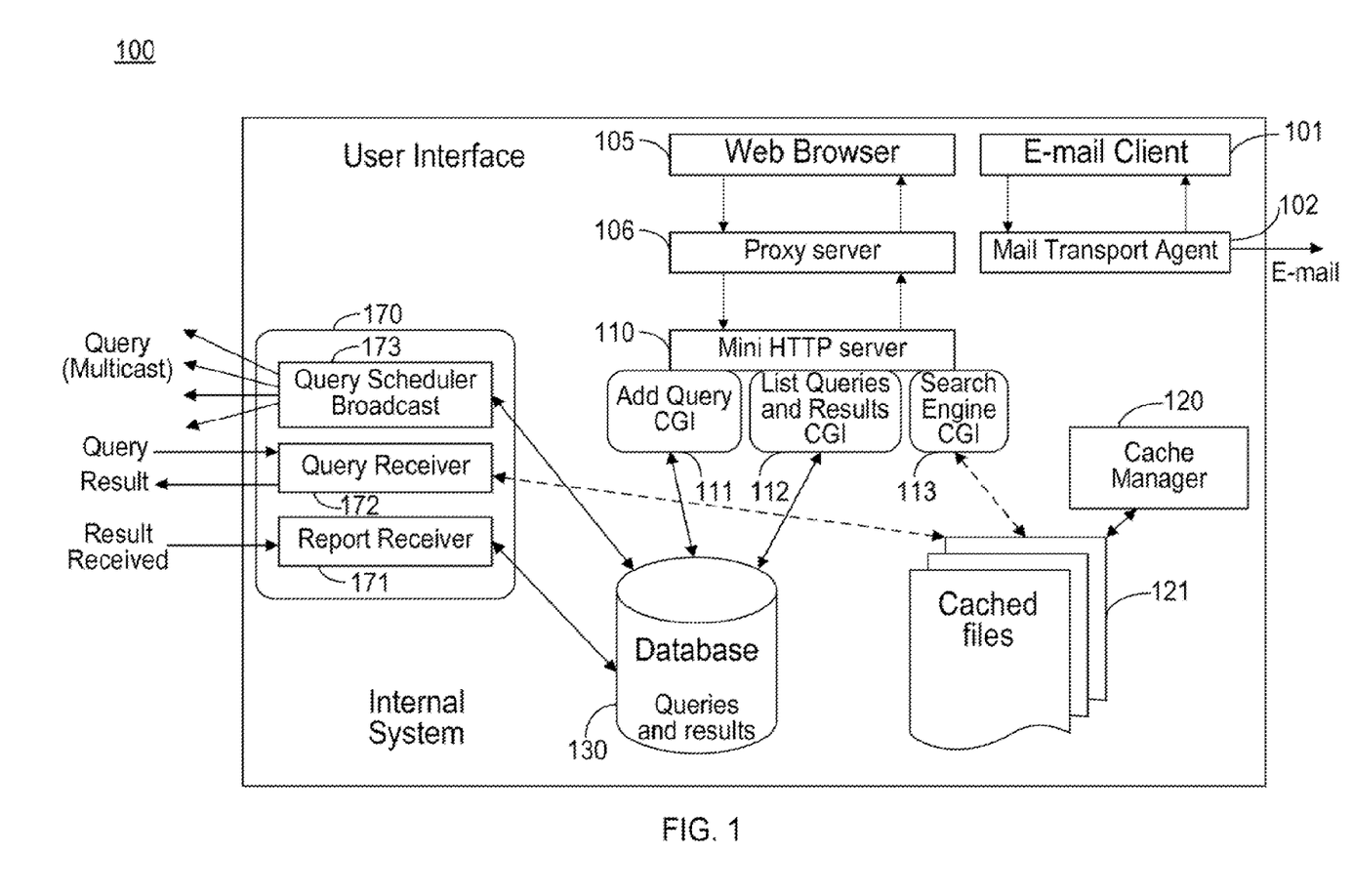
FIG. 1 is a simplified illustration of a system for exchanging data between nodes of disconnected networks in accordance with some embodiments of the disclosed subject matter.
Figure 2:
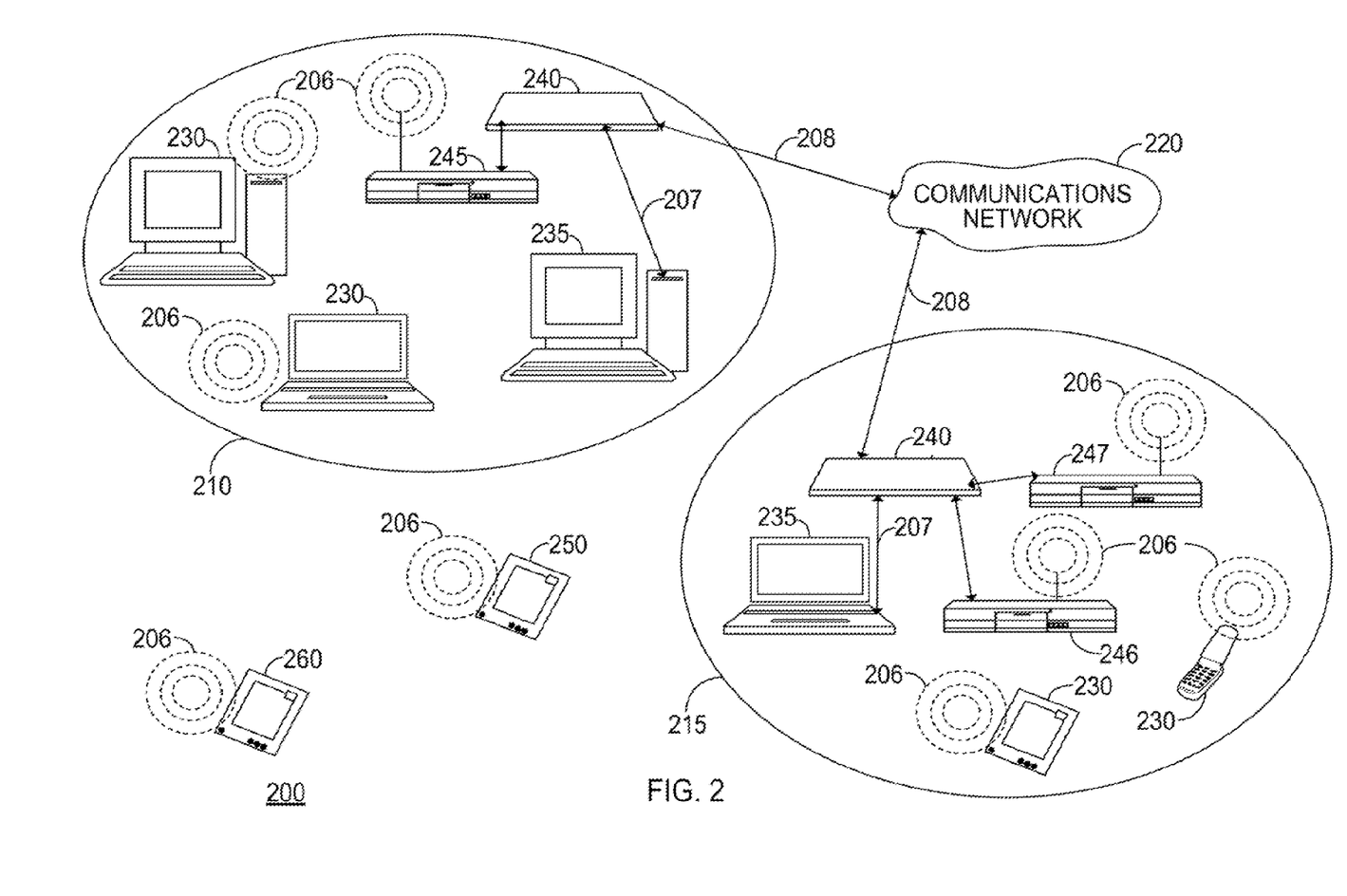
FIG. 2 is a schematic diagram of a system illustrating various systems of FIG. 1 in communication with various other systems of FIG. 1 as well as with various network infrastructure devices in accordance with some embodiments of the disclosed subject matter.

FIG. 2 is a schematic diagram of an illustrative system 200 including network infrastructure devices as well as various nodes that can, for example, implement system 100 in accordance with some embodiments of the disclosed subject matter. As illustrated, system 200 can include one or more mobile nodes (MNs) 230. MNs 230 can be members of a network, such as, for example, subnets 210 and 215. MNs 230 can be connected through wireless communication links 206 to wireless access points, such as, wireless access points 245-247 and/or a router 240. In some embodiments, a router 240 and a wireless access point 245-247 can be one device, such as, for example, a wireless router or wireless switch. Routers 240 can be routers with multiple IP addresses and/or multiple network cards such as, for example, multi-homed routers. Nodes 230 can be any suitable digital processing devices, such as, for example, personal computers, laptop computers, data displays, Internet browsers, personal digital assistants (PDAs), two-way pagers, tablet personal computers, wireless terminals, digital audio players, digital video players, portable telephones (e.g., cellular telephones, voice-over-IP phones, 3G Cellular telephones, etc.), or any combination of the same.

Routers 240 can be connected through one or more communication links 208 to other networks such as, for example, communication network 220. Communications network 220 can be any suitable computer network including, for example, the Internet, an intranet, a wide-area network (WAN), a local-area network (LAN), a wireless network, a digital subscriber line (DSL) network, a frame relay network, an asynchronous transfer mode (ATM) network, a virtual private network (VPN), a mobile ad-hoc network (MANET), a mesh network, a Third Generation (3G) wireless network, a Bluetooth network, an Ultra-wideband (UWB) network, etc., or any combination of any of the same.

In some embodiments, a subnet can have more than one access point. For example, subnet 215 is illustrated with access points 246 and 247. In some embodiments, nodes 230 can communicate with each other and/or with other devices in communication with, for example, a network 220 and/or subnets 210 and 215, through an access point 245-247 and/or a router 240.

Subnets 210 and 215 can also include, for example, stationary nodes 235, which can be connected to a router 240 through, for example, one or more communication links 207. Nodes 235 can be any suitable digital processing devices, such as, for example, personal computers, laptop computers, mainframe computers, Internet browsers, personal digital assistants (PDAs), two-way pagers, wireless terminals, portable telephones, etc., or any combination of the same. Communications links 207 and/or 208 can be any communications links suitable for communicating data between digital data processing devices, such as, for example, network links, dial-up links, wireless links, hard-wired links, etc. Communication links 206 can be any wireless communication links suitable for communicating data between digital processing devices, such as, for example, 802.11 protocols, Bluetooth, and/or Third-Generation Cellular services. System 100 can also be implemented on any of, for example, stationary nodes 235.

In some embodiments, nodes 230 can communicate directly with each other, for example, by using direct wireless communication without the use of, for example, a wireless access point 245-247 or a router 240. In some embodiments, one network interface card can be used to communicate, for example, both directly with other nodes 230 and with an access point 245-247. In some embodiments, a node 230 can have more than one network interface card and can use, for example, a first network interface card to communicate with a wireless access point 245-247 and a second network interface cards to communicate with other nodes 230. In some embodiments, a node 235 can have, for example, one or more wired links connected to a router 240 and, for example, one or more wireless links for communicating with nodes 230. In some embodiments, a node 230 can be connected via a wireless link at some points in time and a wired link at other points in time. For example, a PDA can be connected via a wireless link while the user is away from his desk and can be connected via a wired link when connected to, for example, a base station. In some embodiments nodes can communicate using multicast packets, such as, for example, UDP-over-IPv4 multicast packets or multicast scopes in, for example, an IPv6 network.

Nodes 250 and 260 are nodes like other mobile nodes 230. However, as illustrated, mobile nodes 250 and mobile 260 do not have connectivity to a network. This can be because, for example, they are out of range of any of access points 245-247. If, for example, a user of mobile node 250 desires to send, for example, an e-mail, via communications network 220, mobile node 250 can multicast the e-mail to other mobile nodes within range to be held for future forwarding. In this case, mobile node 260 is within range. If mobile node 260 happens to travel to subnet 215 and connect to access point 246, then mobile node 260 can forward the e-mail to its destination via the network 220. In another example, mobile node 250 may have recently left subnet 210 and may have accessed, for example, a news webpage. The user of mobile node 260 may wish to access this particular new webpage, in which case mobile node 260 sends a multicast a request to other mobile nodes in the vicinity, in this case, mobile node 250. Upon receiving this request, mobile node 250 sends the webpage to mobile node 260.

Figure 3:
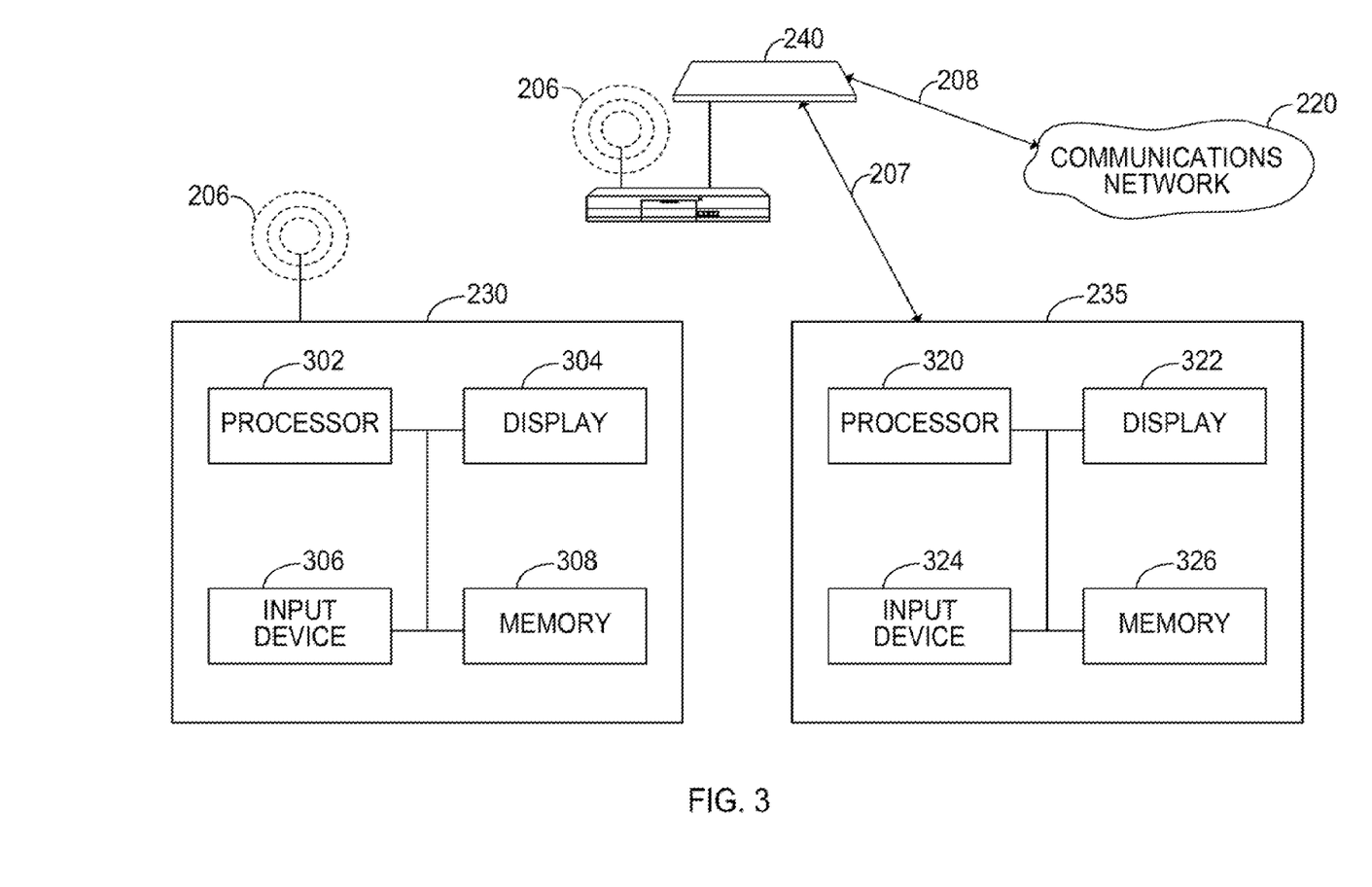
FIG. 3 is an illustration of nodes that can be used in FIG. 2 in accordance with some embodiments of the disclosed subject matter.

Nodes 230 and 235, which are depicted in FIG. 2, are illustrated in more detail in FIG. 3. Referring to FIG. 3, nodes 230 and 235 can include respectively, among other things, processors 302 and 320, displays 304 and 322, input devices 306 and 324, and memory 308 and 326, which can be interconnected. In one embodiment, memory 308 and memory 326 contain a storage device for storing a program for controlling processors 302 and 320. For example, either or both of memory 308 and memory 326 can store applications for performing the methods described herein. Various other applications can also be resident in the memory of nodes 230 and/or nodes 235.

Variations and combinations of system 200 might be suitable for different embodiments of the disclosed subject matter. For example, some embodiments can include a client/server architecture where various nodes 230 and 235 are clients and/or servers. In addition, although the methods and systems of the subject matter are described herein as being implemented on a system 200, various embodiments of the disclosed subject matter can be implemented on any suitable platform. For example, in some embodiments a point of access can be incorporated with a gateway. Also, for example, a mobile node can connect to a network using any appropriate point of access. For example, in some embodiments the point of access can be an access point 245-247, a cellular tower, a base transceiver station (BTS), a radio access network (RAN), a base station controller (BSC), and/or a packet data serving node (PDSN). In some embodiments, a point of access, such as, for example, in a cellular network, can be connected directly to, for example, a communications network 220, a router 240, and/or an intermediate device connected to a communication network 220. In some embodiments, a unique identifier, such as, for example, a MAC address, can identify a point of access.

Discovery of nodes and services, as well as assigning network addresses to various mobile nodes 230 without network connectivity, can be performed using various systems and methods. For example, a mobile node 250 can generate a random network address and send out multicast packets periodically. If no other mobile node 230 has that network address, mobile node 250 can assign that network addresses to itself. To facilitate discovery of services, a mobile node 230 can send out multicast packets periodically which announce services (e.g., e-mail, web services, etc) available on that node. Other nodes can discover services by listening to these multicast messages. To reduce network loading, the frequency of the announcements may be on an exponential back-off schedule, i.e., the announcements may be sent every 1 second, for a predetermined period of time, then every 2 seconds, 4 seconds, 8 seconds, and so on. In addition to listening to multicast announcements from other nodes, a node 230 can also send out requests for needed services to which other nodes can reply.

In some embodiments, multicast DNS (mDNS) can be used for name resolution. DNS Service Discovery (DNS-SD), Simple Service Discovery Protocol (SSDP), and/or Service Location Protocol (SLP) can be used for service discovery. IP addresses can be allocated through a discovery protocol with a cross-platform implementation of Zero Configuration Networking (Zeroconf) such as, Bonjour, available from Apple Inc. A discovery program can publish a service description, for example using ZeroConf publishing services, to clients that are listening for the publish message. The program can also acts as a ZeroConf subscriber so that it can, for example, receive messages that are being published. As services are removed and added, the discovered services can be stored in memory. This can enable the system, for example, to find services and their locations without a discovery server such as DNS Service Discovery.

FIG. 1 illustrates a system 100, which may be referred to as a node, including a user interface 150 and an internal system 160 that can be used for exchanging data between nodes of disconnected networks. User interface 150 can include a web browser 105 and an e-mail client 101. Internal system 160 can include a proxy server 106 that can, for example, route requests to a network or to other nodes, depending on whether network connectivity is present. Web server 110 can, for example, serve data objects to web browser 105, possibly through proxy server 106, and can allow files to be exchanged using, for example, HTTP protocol. A search 113 engine can enable searches of data items available within a node. These data items can be stored, for example, in cached files 121 and can be managed and indexed by cache manager 120. A multicast engine 170 can search for data items across various nodes that are in communication with the system 100. Data items can include, for example, files (e.g., text files, HTML files, image files, music files, video files, etc.) as well as resource identifiers (e.g., Uniform Resource Identifiers (URIs), path and file names, etc.). System 100 can be implemented on any of, for example, mobile nodes 230 and/or stationary nodes 235.

Proxy server 106 can, for example, listen to incoming HTTP requests. Proxy server 106 can decide to serve the request from a cache, the Internet, or through querying other mobile nodes 230 via, for example, a multicast engine, based on the type of request and whether the device is connected to the Internet or not. Proxy server 106 can serve as an interface between the user, the Internet, and other nodes. Proxy server 106, based on the incoming query, can retrieve a data object, for example, a data object determined to be most relevant to a user's request, from a local cache or the Internet. In some embodiments, the local cache can be checked before other locations (e.g., other mobile nodes 230). Proxy server 106 can use, for example, the libcurl library, to retrieve files over the network.

Web server 110 can provide a web-based user interface to the system and can work with the proxy server to display local cached-results in the absence of Internet connectivity. Various web servers can be used in various embodiments. For example, web servers that support, for example, CGI and PHP can be used, such as, for example, thttpd, currently available at http://www.acme.com/software/thttpd. The thttpd binary is only 49 KB in size, making it suitable for, for example, embedded devices. Another web server, which is slightly larger in size, which can be used in some embodiments, is lighttpd, currently available from http://lightpd.net. Shared files can be placed, for example, in a designated directory. This directory can be searched and indexed by various embodiments of the disclosed subject matter.

Figure 4:
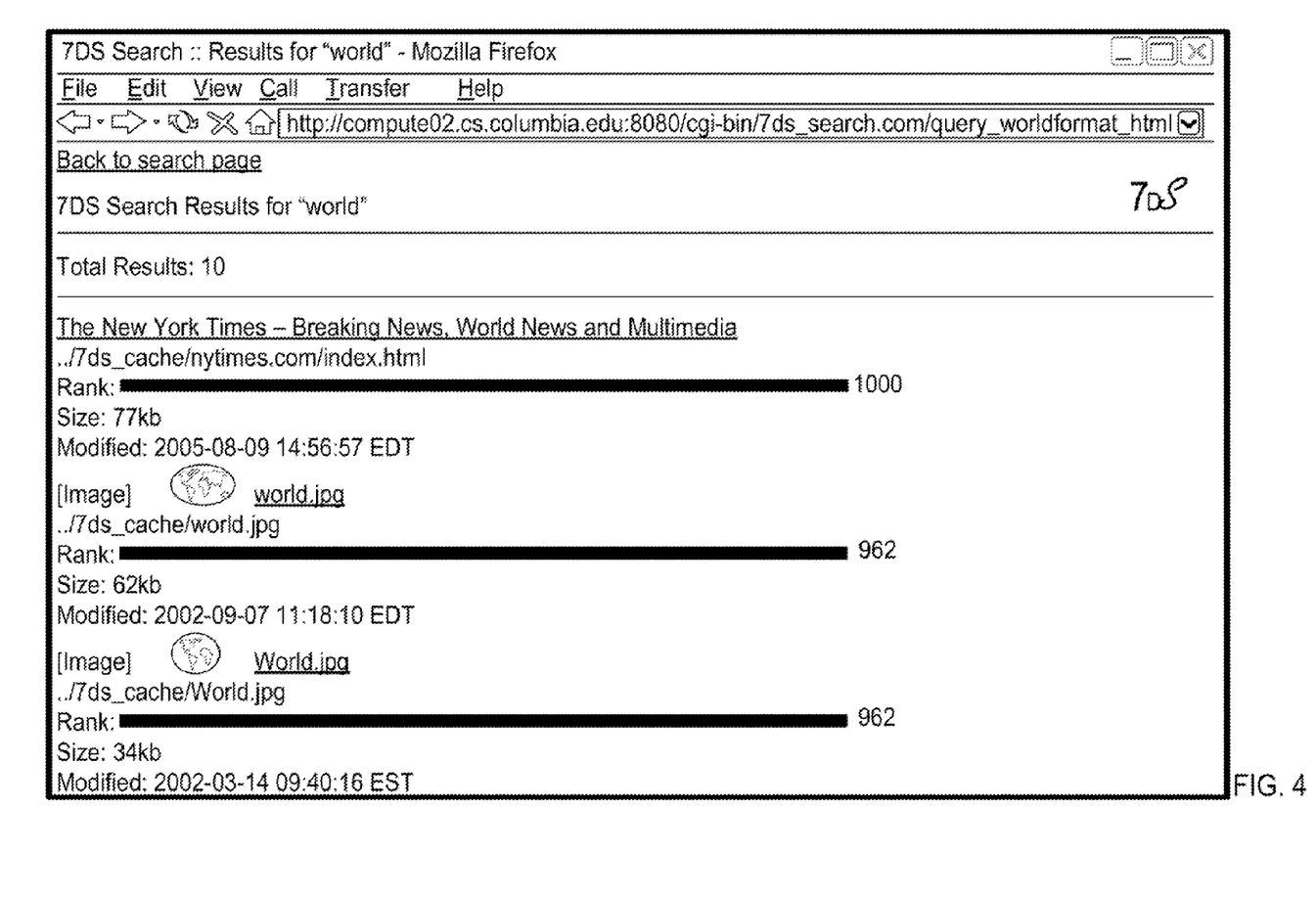
FIG. 4 is an illustration of a screen-shot of search results which can be generated by some embodiments of the disclosed subject matter.

Search engine 113 can be built using the Swish-e library, currently available from http://www.swish-e.org, that can index HTML and XML files for keyword searches. Various file formats, such as Microsoft Word, Adobe PDF documents, and popular image formats such as JPEG, PNG and GIF, can also be indexed through various plug-ins. The search engine can be, for example, a CGI binary that runs on the local web server. It can provide a user the ability to find files corresponding to the requested keyword that exist in the device's internal database/cache. A screenshot of search engine 113 in operation, according to some embodiments, is shown in FIG. 4.

In some embodiments cache manager 120 can be, for example, a daemon that runs in the background at intervals. The interval can be specified in configuration files that can set the default interval at, for example 20 seconds. The cache manager can check if there have been updates to the cache where the shared files reside and can update the indexes used to search the cache if necessary. If there have not been updates to files in that directory, the cache manager can go to sleep without taking any action. Cache manager can index cached files 121 to, for example, create a representation of cached files 121 that is more efficient to search. In some embodiments, cache manager 120 can communicate with proxy server 106 without going through, for example, search engine 113 or web server 110.

Some embodiments can provide a multicast query engine 170, for example, to exchange information among nodes in the network. The user first enters a query through the web-based user interface, i.e., the web browser 105. This query can be added to the device's internal database, which acts as a queue, and then later multicast to other nodes, as further described below. The user can be presented with a dynamic page that, for example, can list results corresponding to a user's request that have been received from other nodes and/or from the user's own cache. The dynamic page, which can be generated by a CGI binary, can refresh, for example, every ten seconds and can provide the user with an updated result list.

In some embodiments, the multicast system can include, for example, a SQLite query database (which can be part or all of Database 150), a query scheduler broadcast engine 173, a query receiver 172, and a report receiver 171. The queries, results, and corresponding nodes can be stored in the SQLite query database 130, which can be implemented with, for example, an open-source database engine such as Sqlite database, currently available from http://www.sqlite.org. The query scheduler broadcast engine 173 can broadcast the query list in an XML-encoded string to the network. It can read the list of queries, encode them in an XML-formatted string, and broadcast the string on a multicast packet. It can sleep for an interval (e.g., 20 seconds by default) and then can resume and broadcast again. The query receiver can listen for incoming packets. Upon receiving a query list, it can run a local search on the device using the search engine. If related information is present, it can, for example, encode the information in an RSS-based XML format and send the XML as a response in UDP packets to the requesting node. The report receiver can listen on a UDP port for packets sent by the query receiver. Upon receiving the XML packet containing the response, it can decode and parse the XML. It can add the information about the queries, corresponding results, and nodes to a database table and can avoiding duplication by checking for duplicates before adding information to the table.

In some embodiments, in addition to the daemon components that can run on a device, CGI programs invoked by the web server can provide the user interface to allow the user to add queries and to view results. The CGI query page can allow a user to add a query to the database. The CGI results page can list the queries that were made and can also shows the results corresponding to each query. The results page can automatically refresh at configurable intervals to return the latest results to the user.

Figure 5:
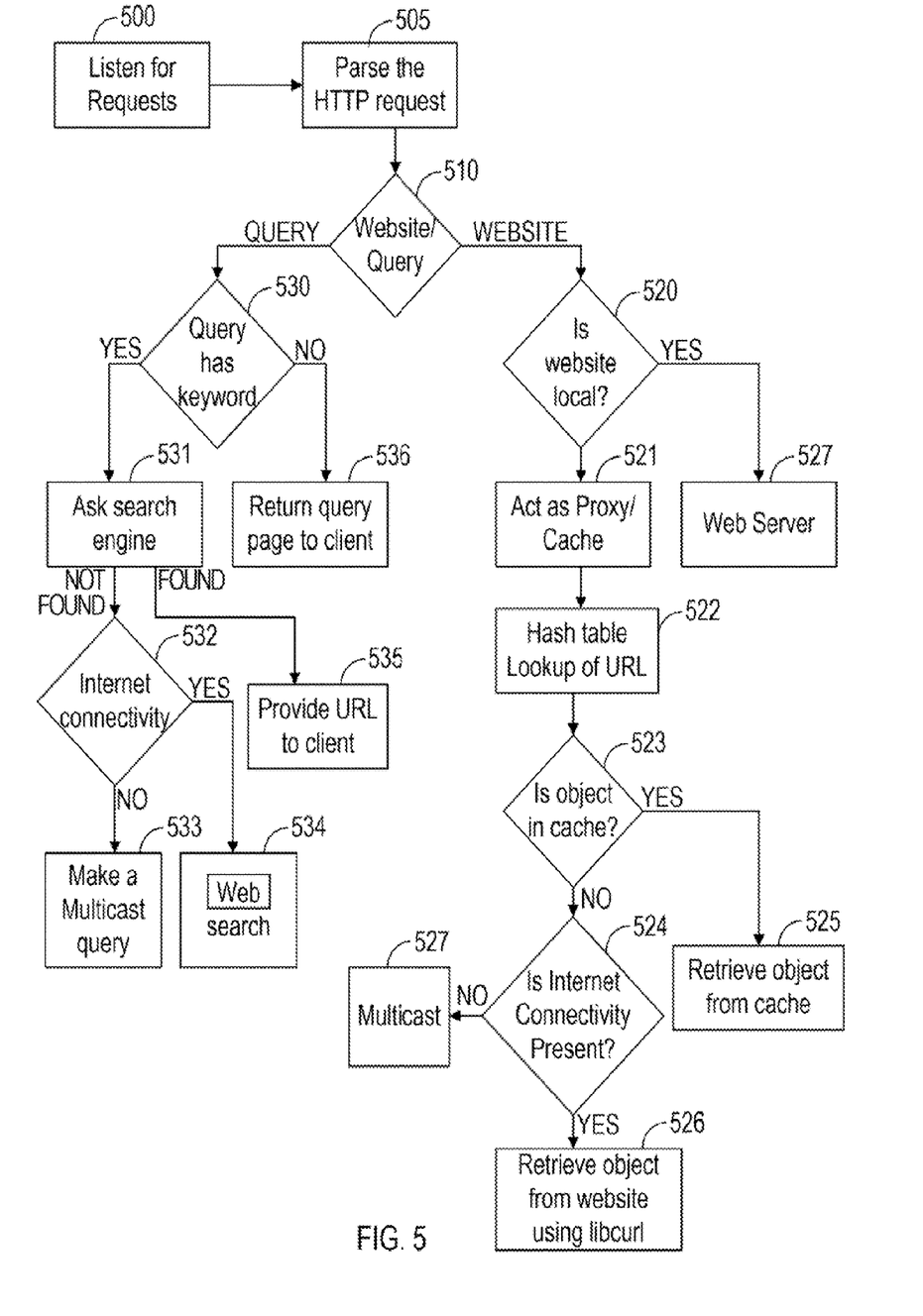
FIG. 5 is a simplified illustration of a method for exchanging data between nodes of disconnected networks in accordance with some embodiments of the disclosed subject matter.

As illustrated in FIG. 5, proxy server 106 of FIG. 1, can listen for requests, at 500. The request can be for example, from a user of device and inputted through web browser 105. The request can be parsed, at 505, for example to identify various keywords and/or uniform resource locaters (URLs). At 510, it can be determined whether the request is for a specific data object, such as, a specific URL (e.g., http://www.columbia.edu) or if the request is a query (e.g., "Columbia and University and New York"). If the requested data object refers to a location on the local mobile node 230, the request can be forwarded directly to web server 110 and returned to the user. One of example a local request would be to a file stored in specific directory on a mobile node 230's local hard drive (e.g., "C:\Documents and Settings\joe\Desktop\vacation.jpg").

If the requested data object is not local, proxy server 106 can act as a proxy and/or cache. The data object can be looked up in various ways, for example, a hash table look up in an index of cached files 121 can be performed, at 522. This look up can be performed by, for example, the cache manager 120, the search engine 113, and/or the proxy server 106. It can be determined, at 523, whether the data object is present in the cached files 121. If so, the data object can be retrieved and returned to the user via, for example, web browser 105. If not, it can be determined, at 524, if Internet connectivity is available. If so, the data object can be retrieved from the Internet, at 526. In various embodiments, a cache of data objects can be examined directly, a cache of data objects can be examined using an index of the cache, or a cache of data objects can be examined by referring to hash of, for example, URLs stored in the cache.

If it is determined that Internet connectivity is not available, at 524, a request can be multicast to other nodes, at 527. The data request can be added, at 111, to database 130 in, for example, a table of queries. Query scheduler broadcast engine 173, can periodically check database 130 for new queries and, if any are present, can multicast them to other mobile nodes 230. At each of these other nodes, query receiver 172 can receive the query and determine if relevant data objects are located in the cached files 121 of the receiving node. If so, that node can send the data item using, for example, send to the requesting node (e.g., as a uni-cast communication). The requesting node can receive the result at report receiver 171 and the report and/or returned data items in the report can be send to web server 110, at 112.

Returning to 510, if it is determined that a user has entered a query into, for example, web browser 105, the query can be analyzed, at 530, to determine if it is in a format the system can process. For example, if the query does not contain any keywords, a page requesting a new query can be sent to web browser 105. If the query is in a format the system can process, cached files 121 can be searched, at 531, to locate related data items. If related data items are located, they can be provided, at 535, to web browser 105. If no relevant data items are located, it can be determined at 532, whether the node has Internet connectivity. If there is internet connectivity, a web search can be performed using any of various available search engines. If there is no Internet connectivity, a multicast query can be sent as described above in reference to reference number 527. In some embodiments, even if local relevant data items are found, a multi cast query can still be sent to acquire, for example, additional and/or more updated data items.

Some embodiments can provide data gathering and data delivery. Various communication protocols can used in providing this, such as, for example, Simple Mail Transfer Protocol (SMTP). An SMTP server can listen to incoming messages and can dump those for which it decided that they are to be propagated through the network to a local Message Transfer Agent (MTA) 102. MTA 102 can relay messages to its neighboring MTAs. The SMTP server can also manage and store received e-mails in a mobile node.

In some embodiments, an SMTP server can receive e-mails from the clients and create, for example, a SHA1 hash, as defined by the National Institute of Standards and Technology, of the email and recipient information. When a node meets another node, its MTA can go through the hash-table and the email directory, read stored e-mails and send them to the other node's MTA. When a node is connected to the Internet, the Transport Engine can sends the e-mails to the intended recipient. Because of possible issues with e-mail duplication, e-mails can be filtered by, for example, sending them through a single server that determines if an e-mail has already been sent and does not send it if so. An acknowledgment can be sent to originator of the delivery of an a data item so that, for example, the originator does not continue to send the data item. This can be useful, for example, where a mobile node 230 does not have sufficient connectivity to send a large data item, but does have sufficient connectivity to be alerted of receipt using a short message (after another mobile node 230 has sent the message for it). Mobile nodes 230 can also deliver delivery alerts to each other, for example, if the originator has no network connectivity and his only in communication with other mobile nodes. It is also possible that a low bandwidth network, akin to a pager network, could be used to return email acknowledgements. In some embodiments, libESMTP, currently available from http://www.stafford.uklinux.net/libesmtp can be used to implement SMTP functionality.

In some embodiments, data objects, such as e-mail, that are multicasted from, for example, mobile node 230 to mobile node 250 can be sent in or with a packet that includes a hop count. This hop count can limit the number of times a data object will be forwarded from one mobile node to another in order to control network loading. For example, if the hop count is set to a value of one, upon receiving an e-mail from mobile node 250, mobile 260 will not forward the e-mail to anther mobile node and will instead only take an action regarding the sending of the e-mail if mobile 260 acquires access to, for example, the Internet. However, if the hop count is set to 10, the e-mail can hop until it has hopped a distance of 10 mobile nodes away from mobile node 250. A time-to-live value can also be set, such that, for example, when that time-to-live value expires the data object will be deleted or otherwise discarded.

In some embodiments, community extensions are provide to enable users to create their own objects such as, for example, events, calendars, maps, and recipes and share them with other users. The community extensions can provide a user with a web-based interface through which the user can enter information for an event or another type of object. The data can be stored in various ways, such as, for example, in an XML file whose schema corresponds to a RELAX NG schema, currently described at http://relaxng.org, for that object. Users can also define their own object types using another web-based interface that provides them with an easy-to-use interface to generate new RELAX NG schemas without having to understand the format.

Figure 6:
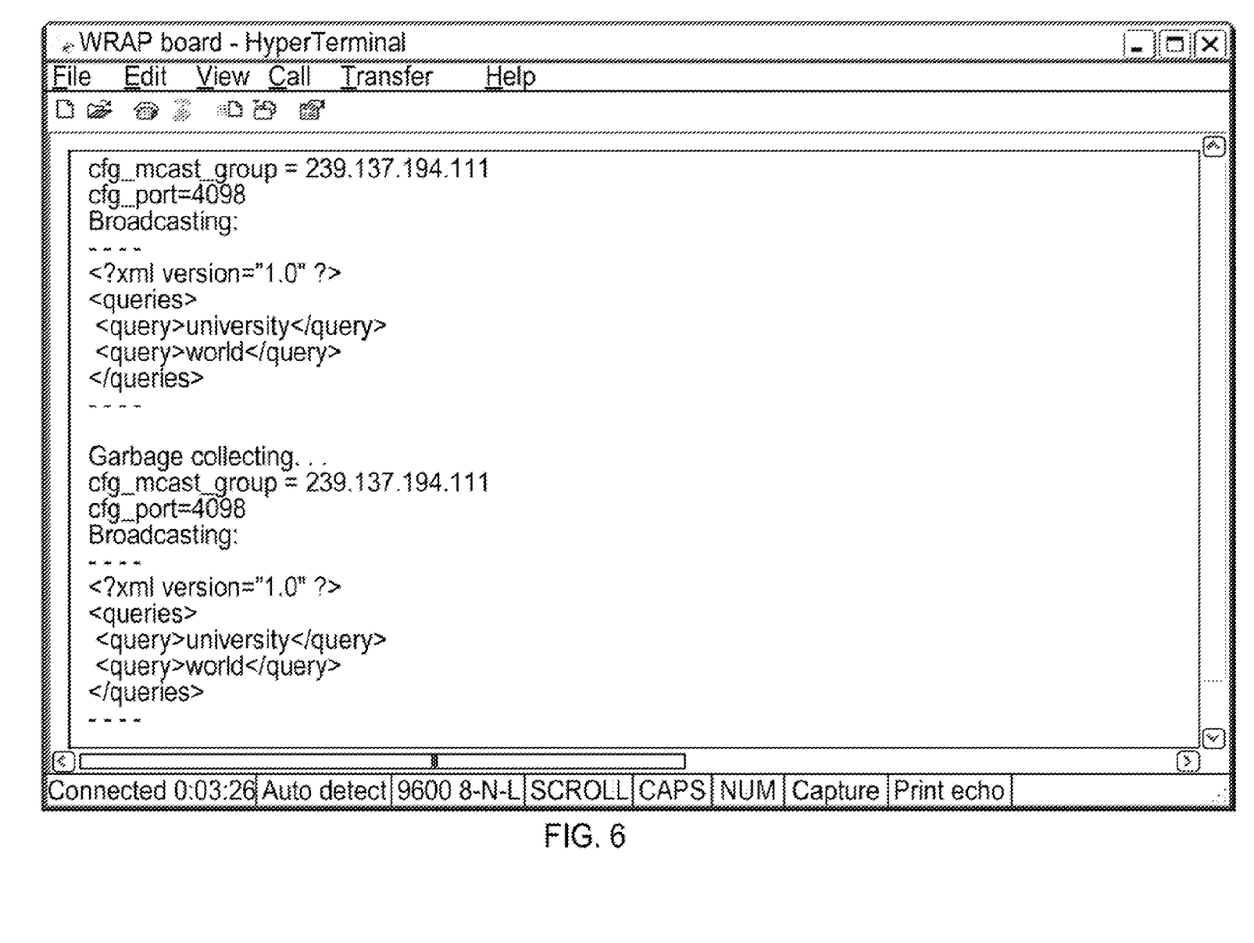
FIG. 6 is an illustration of a screen-shot of a terminal displaying multicast queries in accordance with some embodiments of the disclosed subject matter.
Figure 7:
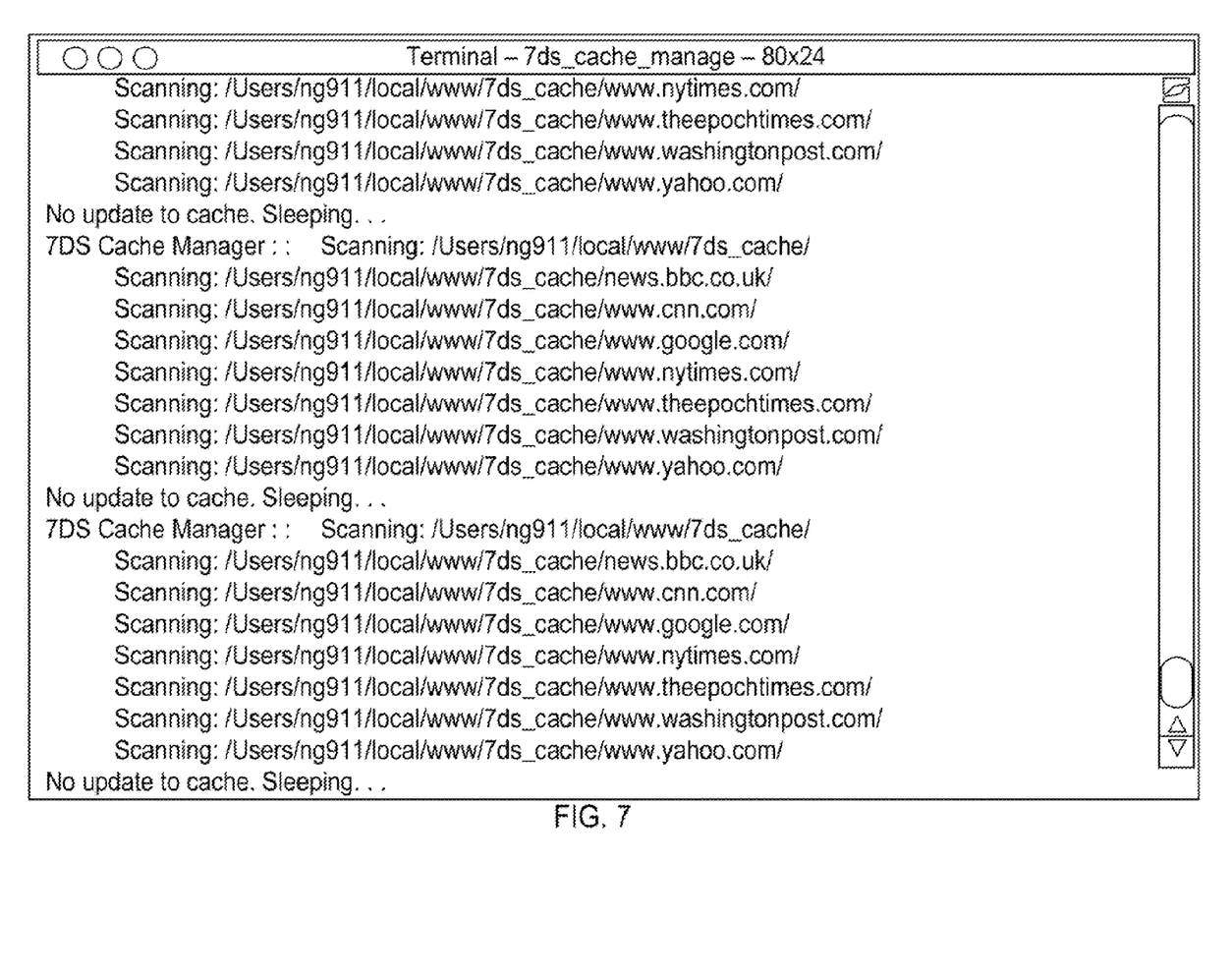
FIG. 7 is an illustration of a screen-shot of a terminal displaying of a cache manger display output in accordance with some embodiments of the disclosed subject matter.

Various embodiments of the disclosed subject matter can be implemented on various systems. For example, various embodiments can be implemented on systems with x86 processors running, for example, Red Hat Linux, Microsoft Windows, Mac OS X, and or embedded systems running small-footprint operating systems such as LEAF Linux. A system implemented on a MAC OS X can use DarwinPorts, currently available at http://www.darwinports.org, for installation. Various programming languages can be used in implementing various embodiments of the disclosed subject matter, such as for example, C, C++, and/or Java. FIG. 6 illustrates a screen shot of a terminal interface displaying multicast broadcast being sent from query scheduler broadcast engine 173. FIG. 7 illustrates a terminal interface displaying cache manager 120 running on a MAC OS X system.

Queries and results can be sent in received in various formats. Queries can be multicasted as formatted query documents, such as XML documents. For example, in some embodiments, queries can be an XML document, with <queries> as the main document root. Queries can be encapsulated within this <queries> root as singleton <query> elements. An example below illustrates an example format, where the XML elements have no attributes.

```
<?xml version="1.0"?>
<queries>
    <query>Query1</query>
    <query>Query2</query>
    <query>Query3</query>
    <query>Query4</query>
</queries>
```

Results can be received as formatted result documents, such as XML documents. For example, results can include, for example, several XML documents, one corresponding to each query. In some embodiments, if a query engine issued three queries, it could expect up to 3 responses from one node, one for each query. The XML format for the response can be based on the RSS format for feeds. For example, <channel> can be the main root element; <sevends_query> can be the element with the name of the original query; <sevends_queryid> can store the internal query name ID of this query. Several <item> RSS elements can be included, one for each query result. Each <item> element can include, for example: <title> (e.g., the title of a webpage); <link> (e.g., a link to the node's cached version of the page); <sevends_rank> (e.g., a ranking of the webpage's relevance to the search, e.g., on a scale of 1-100); <sevends_size> (e.g., the size of a webpage in bytes); and <pubDate> (e.g., the date the page was cached). An example format is provided below.

```
<?xml version="1.0"?>
<channel>
    <sevends_query>Query1</sevends_query>
    <sevends_queryid>0</sevends_queryid>
    <item>
        <title>Query1 Result#1 Title</title>
        <link>http://169.254.0.25:8080/cnn.com/index.html</link>
        <sevends_rank>55</sevends_rank>
        <sevends_size>1024</sevends_size>
        <pubDate>17323934231</pubDate>
    </item>
    <item>
        <title>Query1 Result#2 Title</title>
        <link>http://169.254.0.25/test.com/index.html</link>
        <sevends_rank>55</sevends_rank>
        <sevends_size>1024</sevends_size>
        <pubDate>17323934231</pubDate>
    </item>
</channel>
```

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways within the scope and spirit of the invention.

What is claimed is:

1. A method for exchanging data between nodes of disconnected networks, the method comprising:
   receiving a query including at least one keyword or at least.a portion of a uniform resource identifier via a user interface of a first node;
   determining in the first node a query type based on whether the query includes at least one keyword or at least a portion of a uniform resource identifier;
   performing a search of a cache of the first node based on the query and the query type;
   converting the query into a formatted query document;
   storing the formatted query document in a database of the first node, if the search of the cache does not yield at least a predetermined number of data items;
   retrieving the formatted query document from the database of the first node at a predetermined interval;
   multicasting the retrieved formatted query document from the. first node to at least a second node;
   receiving, at the first node, a formatted response document from the second node, the formatted response document resulting from a search of a cache of the second node;

converting the formatted response document into a display document; and presenting the displaying document to the user via the user interface of the first node.

2. The method of claim 1, wherein the predetermined number of data items is set to at least ten if the query is a keyword-type query and is set to one if the query is uniform resource identifier-type query.

3. The method of claim 1, wherein the predetermined interval is at least one of random and periodic.

4. The method of claim 1, wherein both the formatted query document and the formatted response document are XML documents.

5. The method of claim 1, wherein the formatted response document includes at least one of an embedded text file, music file, webpage, and video file.

6. The method of claim 1, further comprising:

receiving, at the first node, a formatted query document from the second node; and sending a formatted response document to the second node based on a search of the cache of the first node based on the formatted query document received from the second node.

7. The method of claim 1, further comprising:

receiving an e-mail via a user interface of the first node; and multicasting the e-mail to at least the second node with a request that the second node deliver the e-mail.

8. The method of claim 1, wherein the first node is at least one of a personal digital assistant, laptop computer, and portable telephone.

9. A non-transitory computer-readable medium storing computer-executable instructions that, when executed by a processor, cause the processor to perform a method for exchanging data between nodes of disconnected networks, comprising:

receiving a query including at least one keyword or at least a portion of a uniform resource identifier via a user interface of a first node;

determining in the first node a query type based on whether the query includes at least one keyword or at least a portion of a uniform resource identifier;

performing a search of a cache of the first node based on the query and the query type;

converting the query into a formatted query document;

storing the formatted query document in a database of the first node, if the search of the cache does not yield at least a predetermined number of data items;

retrieving the formatted query document from the database of the first node at a predetermined interval;

multicasting the retrieved formatted query document from the first. node to at least a second node;

receiving, at the first node, a formatted response document from the second node, the formatted response document resulting from a search of a cache of the second node;

converting the formatted response document into a display document; and presenting the displaying document to the user via the user interface of the first node.

10. The non-transitory computer readable medium of claim 9, wherein the predetermined number of data items is set to at least ten if the query is a keyword-type query and is set to one if the query is uniform resource identifier-type query.

11. The non-transitory computer readable medium of claim 9, wherein the predetermined interval is at least one of random and periodic.

12. The non-transitory computer readable medium of claim 9, wherein both the formatted query document and the formatted response document are XML documents.

13. The non-transitory computer readable medium of claim 9, wherein the formatted response document includes at least one of an embedded text file, music file, webpage, and video file.

14. The non-transitory computer readable medium of claim 9, wherein the method. further comprises:

receiving, at the first node, a formatted query document from the second node; and sending a formatted response document to the second node based on a search of the cache of the first node based on the formatted query document received from the second node.

15. The non-transitory computer readable medium of claim 9, wherein the method further comprises:

receiving an e-mail via a user interface of the first node; and multicasting the e-mail to at least the second node with a request that the second node deliver the e-mail.

16. The non-transitory computer readable medium of claim 9, wherein the first node is at least one of a personal digital assistant, laptop computer, and portable telephone.

* * * * *

UNITED STATES PATENT AND TRADEMARK OFFICE
CERTIFICATE OF CORRECTION

PATENT NO. : 8,626,844 B2  
APPLICATION NO. : 12/593209  
DATED : January 7, 2014  
INVENTOR(S) : Henning G. Schulzrinn et al.

It is certified that error appears in the above-identified patent and that said Letters Patent is hereby corrected as shown below:

In the Claims

Column 10, line 50 (Claim 1, line 4) "least. a portion," should be --least a portion--.
Column 12, line 7 (Claim 9, line 21) "the first. node," should be --the first node--.
Column 12, line 29 (Claim 14, line 2) "the method. further," should be --the method further--.

Signed and Sealed this
Eighth Day of April, 2014

Michelle K. Lee
*Deputy Director of the United States Patent and Trademark Office*